United States Patent
Youn

(10) Patent No.: US 7,263,128 B2
(45) Date of Patent: Aug. 28, 2007

(54) TRIPLE-BUFFERING METHOD FOR OVERLAPPED MOTION COMPENSATION IN A VIDEO DECODER

(75) Inventor: Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 764 days.

(21) Appl. No.: 10/294,647

(22) Filed: Nov. 13, 2002

(65) Prior Publication Data

US 2004/0091051 A1    May 13, 2004

(51) Int. Cl.
*H04B 1/66* (2006.01)

(52) U.S. Cl. .......................... 375/240.24; 375/240.25; 375/240.16; 375/240.26; 375/240.12; 375/240.23; 348/699; 382/233; 382/235; 382/238; 345/537; 345/539

(58) Field of Classification Search .......... 375/240.24, 375/240.25, 240.26, 240.23, 24.18, 240.16, 375/240.12; 345/537, 539; 348/699; 382/233, 382/235, 238
See application file for complete search history.

(56) References Cited

U.S. PATENT DOCUMENTS 6,542,541 B1 * 4/2003 Luna et al. ............. 375/240.01
6,781,589 B2 * 8/2004 Macy et al. ................. 345/537

* cited by examiner

*Primary Examiner*—Shawn S. An
(74) *Attorney, Agent, or Firm*—John P. O'Banion

(57) ABSTRACT

A method of improving performance within video decoders subject to the execution of overlapped motion compensation. The method utilizes a triple-buffering approach to achieve rapid data transfers and to eliminate transfer and decoding delays. Each of the three buffers is sequentially utilized for (i) receipt of decoded macroblock data, (ii) insertion of additional decoded macroblock data from a subsequent decoding stage, and finally (iii) the transfer of the collected macroblock data to a transfer buffer. The method is applicable to a number of multiprocessing decoders, and is especially well suited for MPEG-4 and H.263 multiprocessing decoders.

17 Claims, 9 Drawing Sheets

TRIPLE-BUFFERING METHOD FOR OVERLAPPED MOTION COMPENSATION IN A VIDEO DECODER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public files or records of the United States Patent and Trademark Office, but otherwise reserves all copyright rights whatsoever. The copyright owner does not hereby waive any of its rights to have this patent document maintained in secrecy, including without limitation its rights pursuant to

BACKGROUND OF THE INVENTION

1. Field of the Invention

This invention pertains generally to video motion compensation, and more particularly to a method of providing overlapped motion compensation of video by utilizing a triple-buffering method.

2. Description of the Background Art

Motion compensation of video streams, such as video recordings, is important for reducing spurious movement which detract from the professional appearance of the resultant video. One traditional method of obtaining motion compensation is by utilizing overlapped motion compensation. Typically, overlapped motion compensation is performed with MPEG-4 bit streams wherein the flag obmc_disable=0, or when the optional "advanced prediction mode" is enabled within an H.263 bit stream. Each of the pixels within an eight-by-eight (8*8) luminance prediction block is provided as a weighted-sum of three prediction values which are divided by eight (8), and preferably subject to rounding. To arrive at three prediction values, three motion vectors are generally utilized, the motion vector of the current luminance block, as well as two out of four "remote" vectors. The remote vectors may comprise the motion vector at either the left or right side, or above and below, the current luminance block.

To obtain a value for each pixel, the remote vectors of the block at the two nearest block borders are utilized. For example, within the upper half of the block the motion vector corresponding to the block above the current block is selected for use, while for the lower half of the block, the motion vector corresponding to the block at the left side of the current block is utilized.

The generation of each pixel $\bar{p}(i,j)$ in an 8*8 luminance prediction is governed by the following equation:

$$\bar{p}(i,j)=((q(i,j) \times H_0(i,j))+(r(i,j) \times H_1(i,j))+(s(i,j) \times H_2(i,j))+4)//8$$

wherein $q(i,j)$, $r(i,j)$, and $s(i,j)$ are pixels from the referenced picture defined by:

$$q(i,j)=p(i+MV_x^0, j+MV_y^0)$$

$$r(i,j)=p(i+MV_x^1, j+MV_y^1)$$

$$s(i,j)=p(i+MV_x^2, j+MV_y^2)$$

In the equations above, $(MV_x^2, MV_y^0)$ denote the motion vector from the current block, and $(MV_x^1, MV_y^1)$ denotes the motion vector of the block either above or below the current block, while $(MV_x^2, MV_y^2)$ denotes the motion vector for either to the left or the right of the current block. The matrices $H_0(i,j)$, $H_1(i,j)$, and $H_2(i,j)$ are defined within both the MPEG-4 and the H.263 coding standards.

FIG. 1 illustrates a multiprocessing video decoder comprising a first processor for a sequential task and a transfer buffer which connects to one or more processors for additional tasks. This multiprocessing architecture separates data dependent operations, which are to be performed sequentially, from the data independent operations which may be performed on a macroblock basis. According to the multiprocessor paradigm, performance is subject to the efficiency with which the data is transferred between processors. The data being transferred is structured in transfer units, such as block level transfers. It will be appreciated that the data is typically transferred utilizing conventional double-buffering methods which was described for the multiprocessing architecture incorporated by reference.

Each data transfer executed between processors reduces the amount of processor bandwidth available for task execution. It should be appreciated that data transfers made between processing elements are typically expensive in relation to the amount of processing time which is utilized. The expense of the transfer is exacerbated when the buffer is implemented with slow-memory devices in order to reduce the implementation costs, since the access times of the memory is slow in comparison with the time required to perform a general arithmetic operation. Conventional double-buffering is typically utilized to eliminate the delay caused by accessing the memory device(s) of the buffer.

FIG. 2 illustrates the use of double-buffering of transfers between processors within the referenced multiprocessing decoder architecture. The double-buffer mechanism comprises a first buffer and a second buffer. The decoded data MB(x) at time x along the time axis, can be transferred to a transfer buffer from which the data is delivered to the multiple processing elements. It will be appreciated that while the transfer from the second buffer is occurring, the processor can continue processing the next macroblock because the first buffer is available for use. Therefore, the time interval over which instructions may be processed is not subject to the time lost during the transfer from the buffer.

Conventional decoder systems utilize double-buffering mechanism, however, these can suffer from performance losses when operating in an overlapped motion compensation mode. It has been determined that one of the reasons for the slow performance within existing systems is a result of the need for a subsequent, or future, macroblock in order to process the vector information.

FIG. 3 depicts a macroblock comprising four block positions, one through four.

FIG. 4 depicts the relationship within a current macroblock being decoded and four neighboring macroblocks. The values MVu, MVl, MVr, and MVd represent the motion vectors, wherein MVu is in block three of the upper macroblock, MVl is in block two of the left macroblock, MVr is in block two in the current macroblock, and MVd is in block three of the current macroblock. The motion vector of block one is in the current macroblock is represented by MVc. It will be appreciated, as depicted within the figure, that all motion vectors are available at the time the header information of the current macroblock is decoded since it does not refer to any future macroblocks. As a result, overlapped motion compensation can be executed immediately after decoding the current macroblock.

FIG. 5 and FIG. 6 depict two situations wherein a future motion vector is required in order to perform overlapped motion compensation within the current macroblock. The block MVr is carried to the next macroblock in the right-side of the spatial domain. It will be appreciated that since the right-side macroblock is not being decoded, the information is not available.

FIG. 7 and FIG. 8 illustrate a few drawbacks associated with the use of double buffering within the multiprocessing architecture described. As a macroblock is being decoded at (x+1) in FIG. 7, the decoded macroblock information at x is unable to be transferred because the next motion vectors have not yet been decoded. Therefore, the motion vectors of the macroblock at (x+1) are inserted within the macroblock data. Upon decoding the subsequent motion vector, the data in buffer 2 is transferred as shown in FIG. 8. It will be appreciated, however, that buffer 1 cannot be updated as it has not yet been transferred and the processor cannot commence decoding the next macroblock as there is not an available buffer.

Therefore, a need exists for a buffering mechanism for use with overlapped motion compensation that doesn't create a performance bottleneck without adding undue complexity to the video decoder as outlined above. The present invention satisfies those needs, as well as others, and overcomes the deficiencies of previously developed.

BRIEF SUMMARY OF THE INVENTION

The operation of a video decoder in selected applications can greatly benefit from the use of multiprocessing. For example, by separating the data dependent (sequential) operations, from the data independent operations, and utilizing multiple processors to execute the data independent operations on the data received from the processor performing the data dependent operations. However, when performing overlapped motion compensation within decoders having a multiprocessing architecture the use of conventional buffering mechanisms create a performance bottleneck.

A triple-buffering mechanism is described within the present invention which removes the bottleneck when the decoder is utilized for performing overlapped motion compensation. In addition, motion vector information from a current macroblock may be inserted within a macroblock being decoded from a prior time period. Macroblock data is only transferred to the transfer buffer from the oldest buffer of the three buffers, within which all necessary data has been collected for the particular macroblock data. It will be appreciated that executing overlapping motion compensation requires the use of information from two macroblock periods, and that the present invention provides for the collection of the macroblock information over those two periods prior to being loaded into the transfer buffer. The macroblock data, therefore, which is contained within the three buffers includes information spanning two macroblock periods wherein overlapping motion compensation may be executed without incurring additional delays. Each of the three buffers is sequentially utilized for (1) receipt of macroblock data, (2) insertion of additional macroblock data from a subsequent decoding stage, and finally (3) the transfer of the collected macroblock data to a transfer buffer.

The method generally comprises utilizing a set of three buffers which are sequentially selected for receipt of macroblock data. One of the three buffers is selected from which to transfer decoded macroblock data to a transfer buffer, while macroblock data is being simultaneously decoded in the remaining two buffers. One of the two buffers contains macroblock information from the previous decoding stage into which macroblock data from the current decoding stage is being inserted, while the other buffer receives macroblock data about the current decoding stage. The decoding stage is advanced wherein macroblock data from the buffer which has received macroblock information from both the current and previous decoding stages is transferred to a transfer buffer. The buffer from which data was previously transferred to the transfer buffer is then selected to receive current macroblock information. The buffer which previously received current macroblock information will then insertably receive macroblock information about the present decoding stage in preparation for transfer to the transfer buffer. The method may be utilized for multiprocessing video decoders which follow any of a number of formats, including MPEG-4, H.263, and those having similar architectures.

An object of the invention is to increase of efficiency with which overlapped motion compensation may be performed on multiprocessing decoders.

Another object of the invention is to provide macroblock buffering wherein all necessary information is first collected prior to being transferred to the transfer buffer.

Another object of the invention is to provide macroblock buffering wherein registered macroblock information is not delayed while awaiting the availability of an empty buffer.

Another object of the invention is to provide macroblock buffering wherein the next motion vector is inserted in the currently decoded macroblock.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
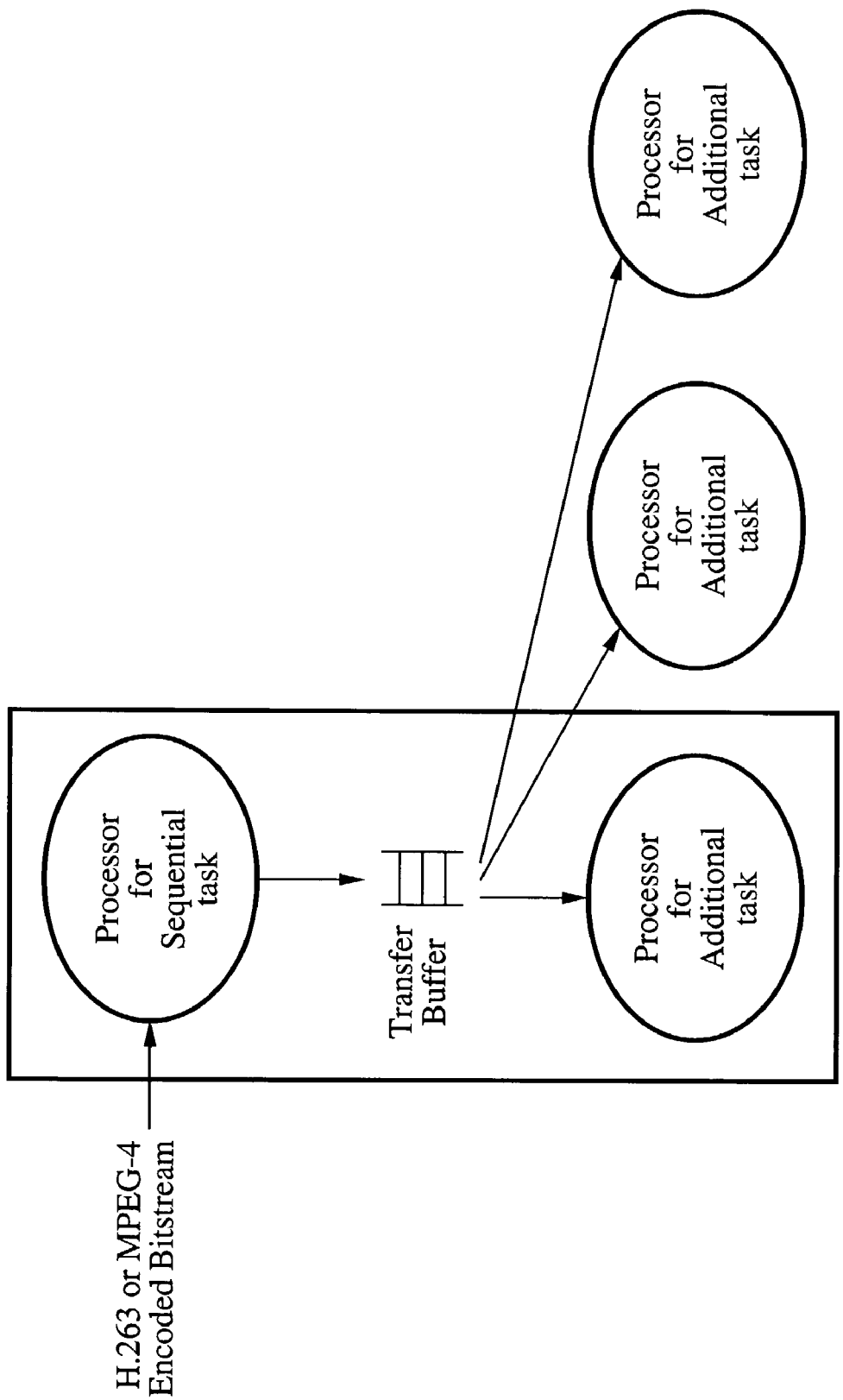
FIG. 1 is a block diagram of bit stream flow within a multiprocessing video decoder.
Figure 2:
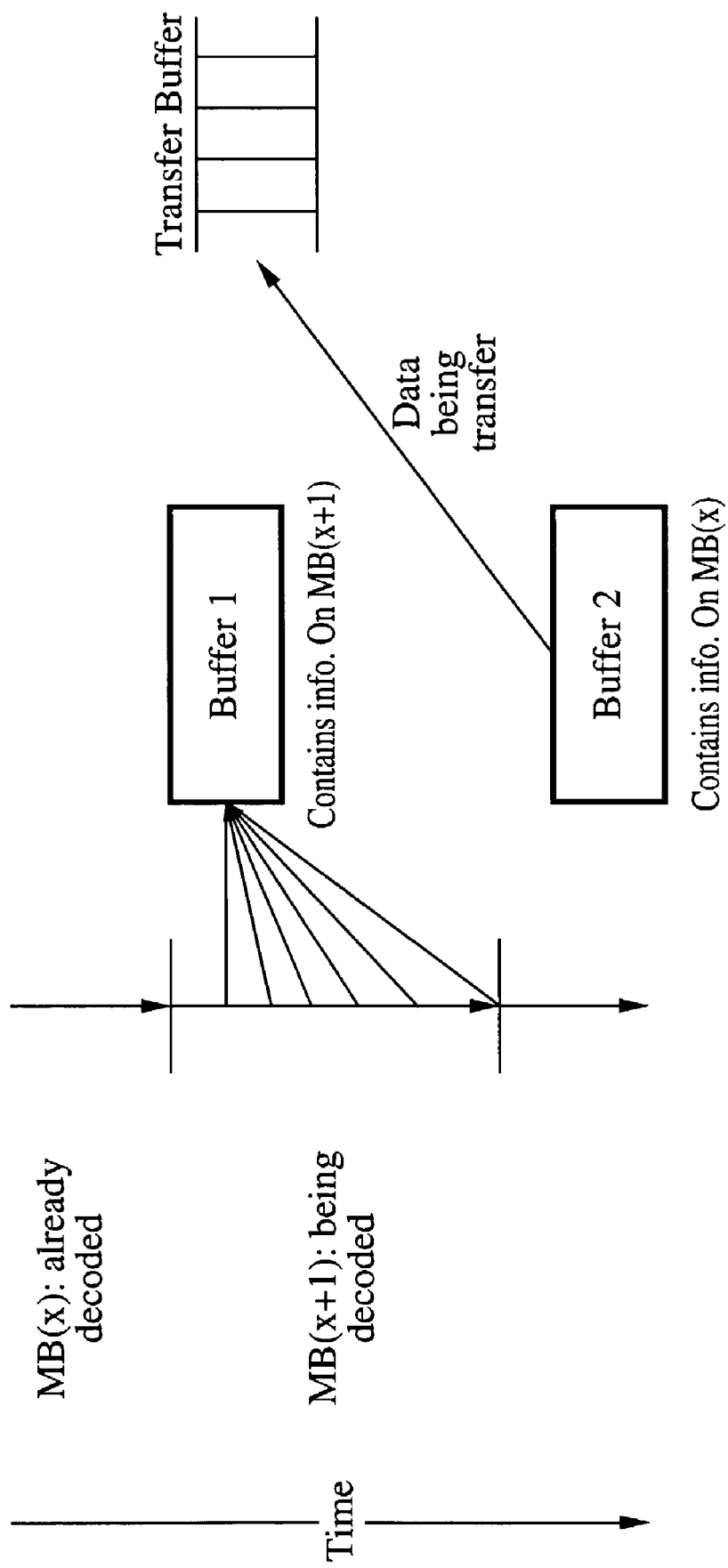
FIG. 2 is a schematic of conventional buffering within a video decoder.
Figure 3:
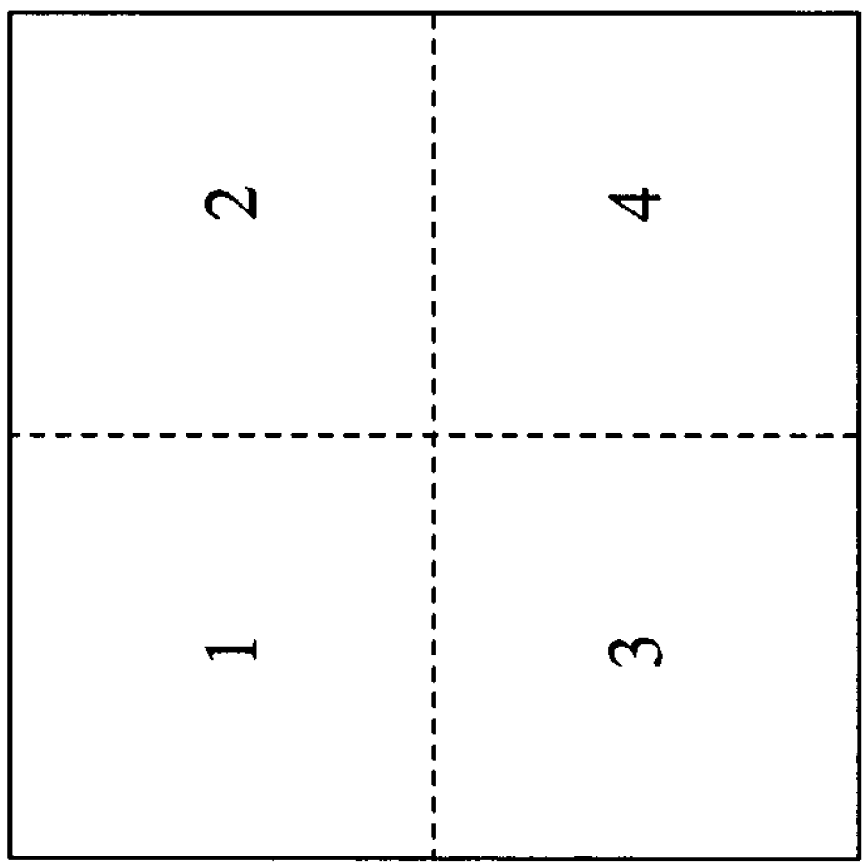
FIG. 3 is a block diagram of block positions within a macroblock.
Figure 4:
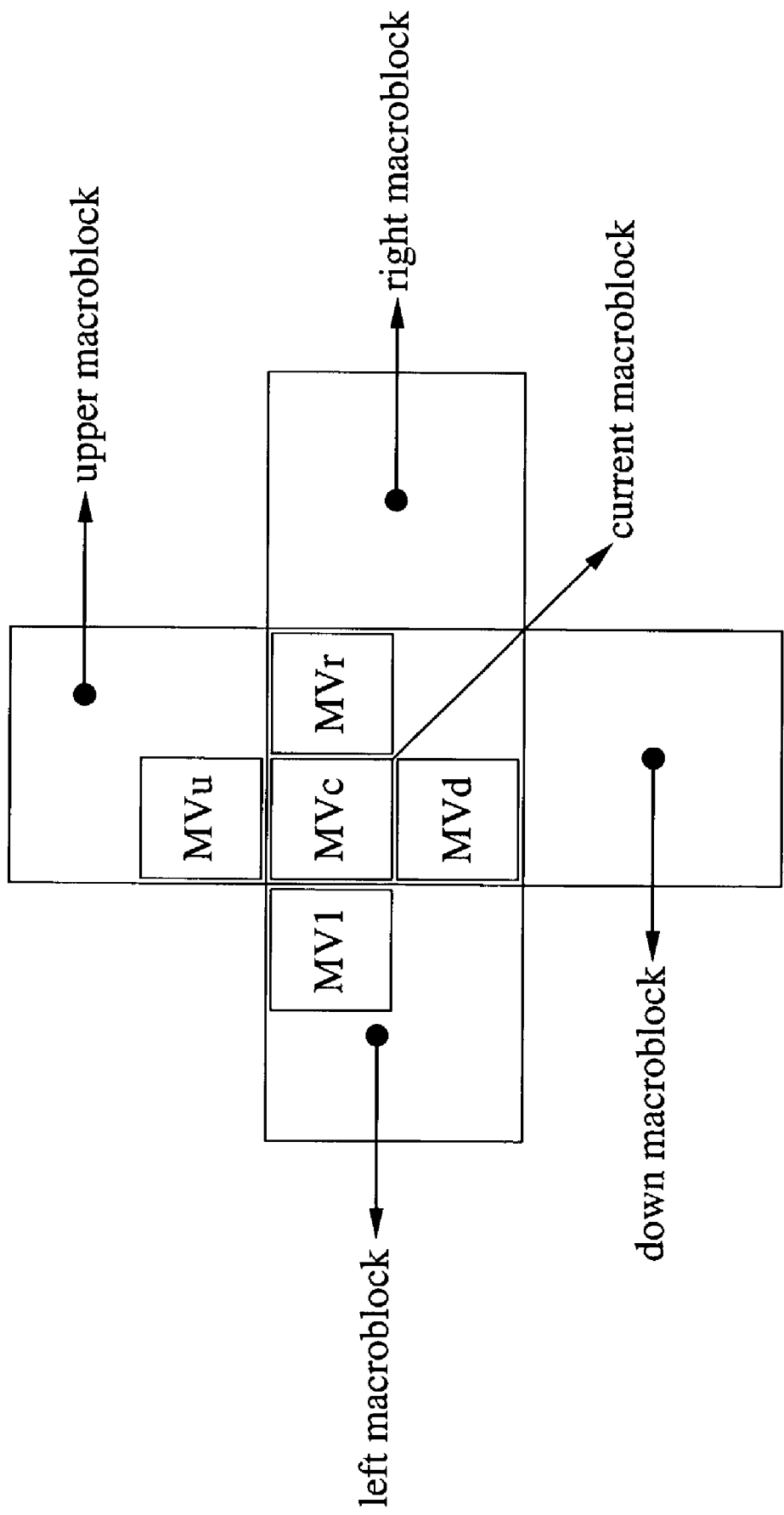
FIG. 4 is a block diagram of motion vectors a current macroblock and neighboring macroblocks.
Figure 6:
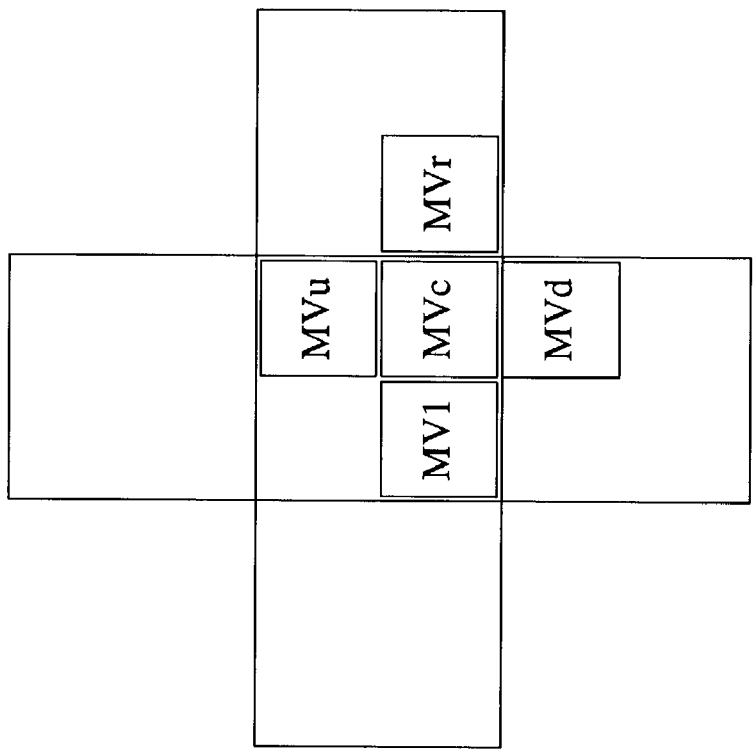
FIG. 6 is a block diagram of a macroblock being decoded at time (x+1).
Figure 5:
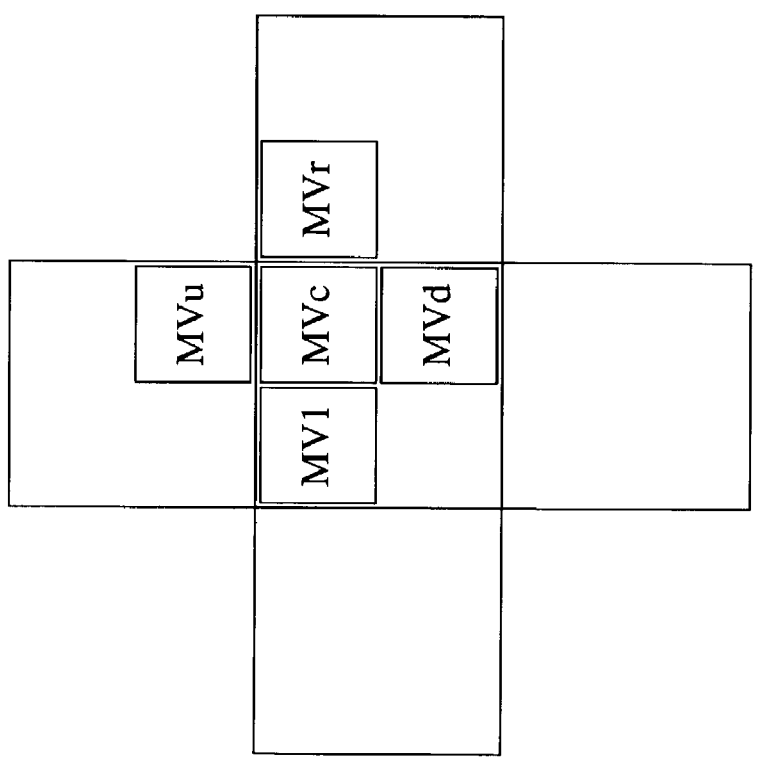
FIG. 5 is a block diagram of a macroblock being decoded at time x.
Figure 7:
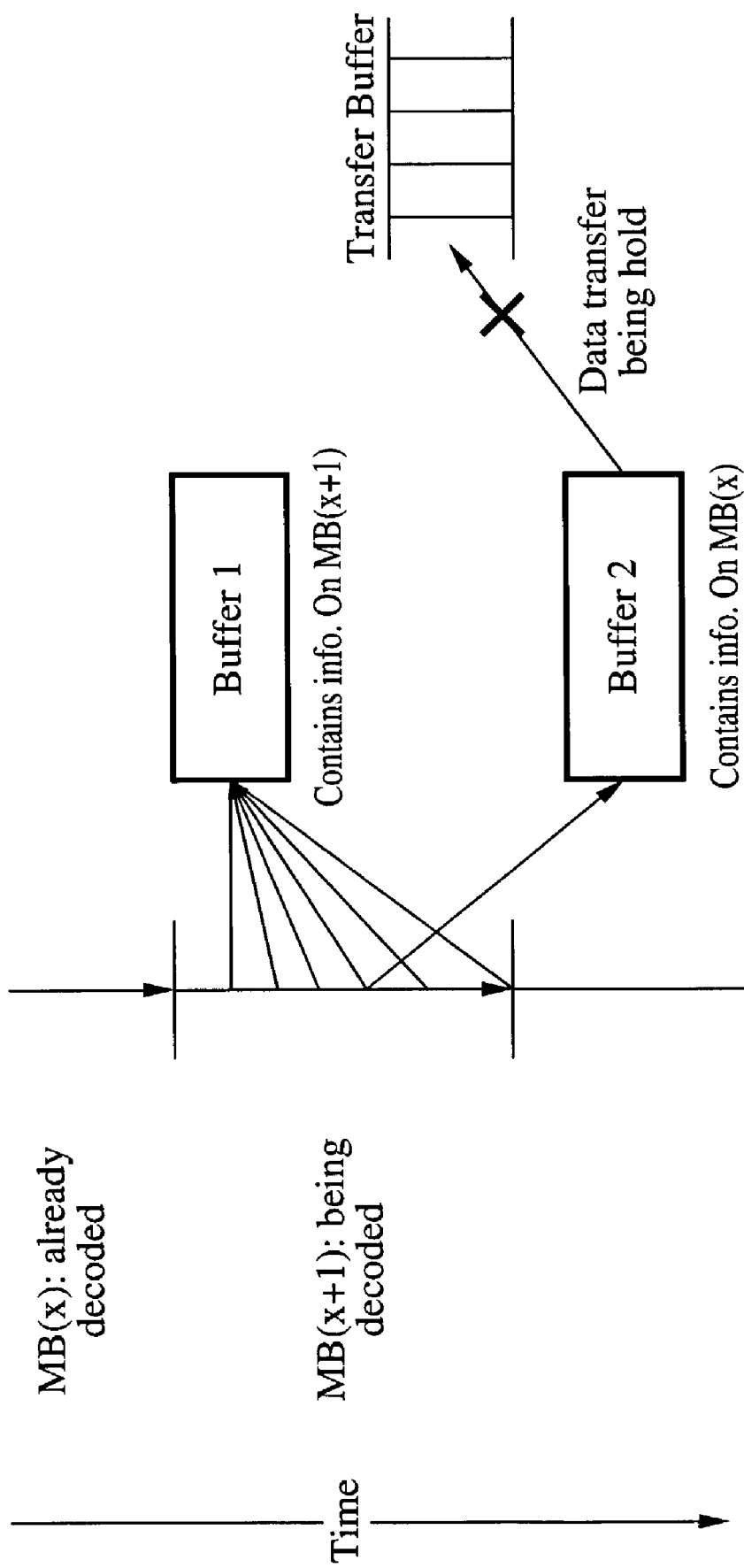
FIG. 7 is schematic of a conventional buffer transfer mechanism, shown at time (x+1).
Figure 8:
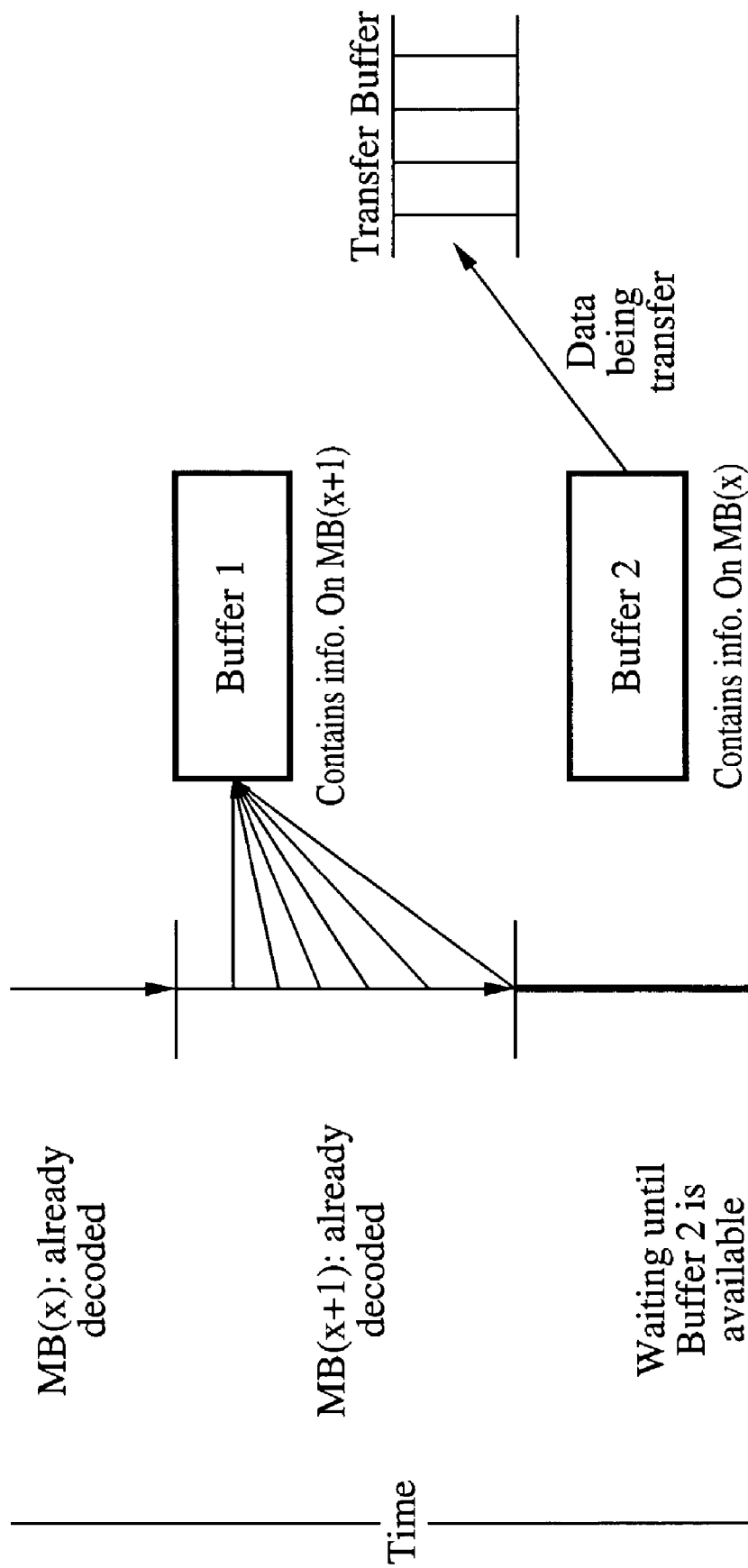
FIG. 8 is schematic of a conventional buffer transfer mechanism as depicted in FIG. 7 at a subsequent time (x+2).
Figure 9:
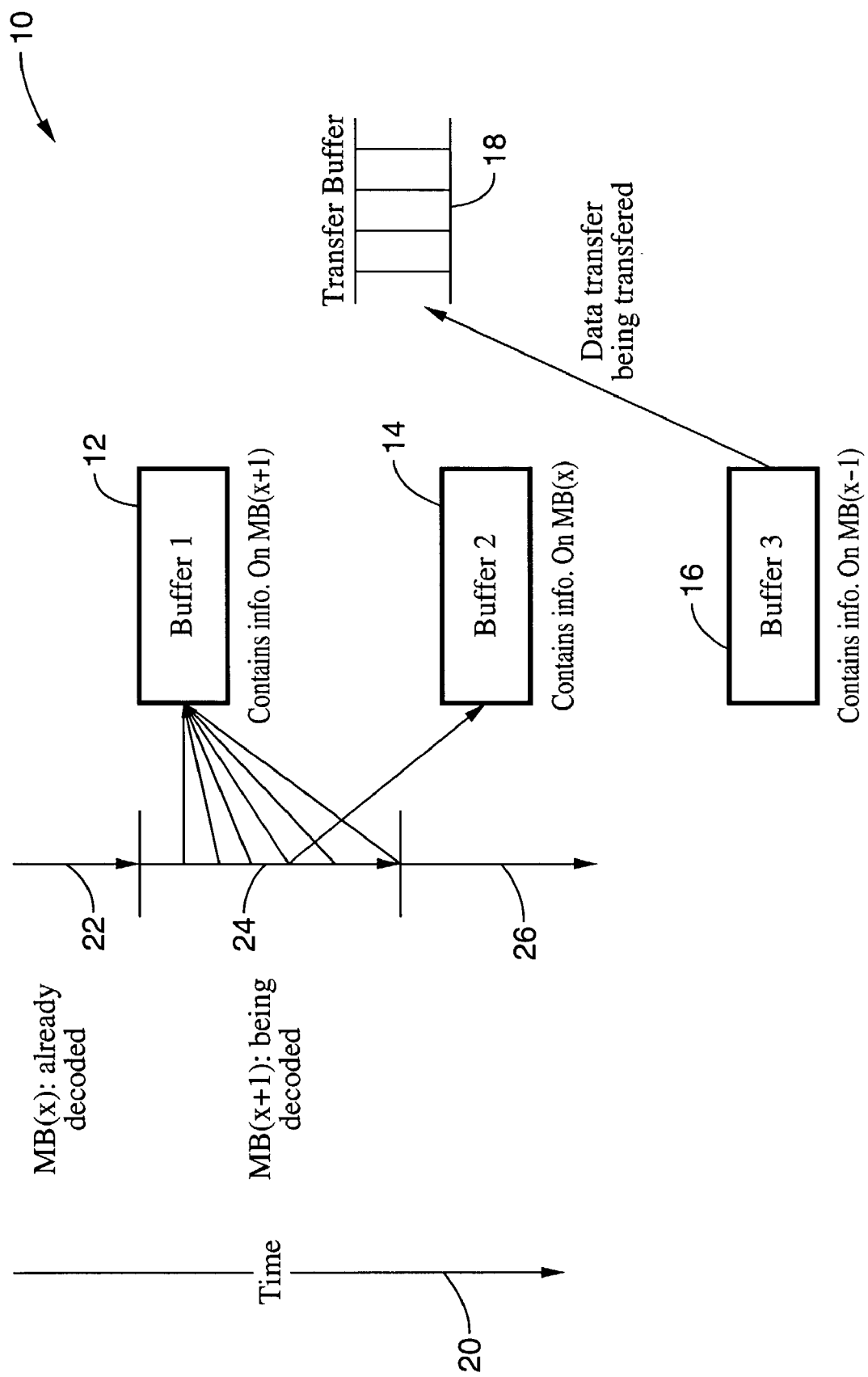
FIG. 9 is schematic of triple-buffering of macroblock information according to an embodiment of the present invention, shown at time (x+1).
Figure 10:
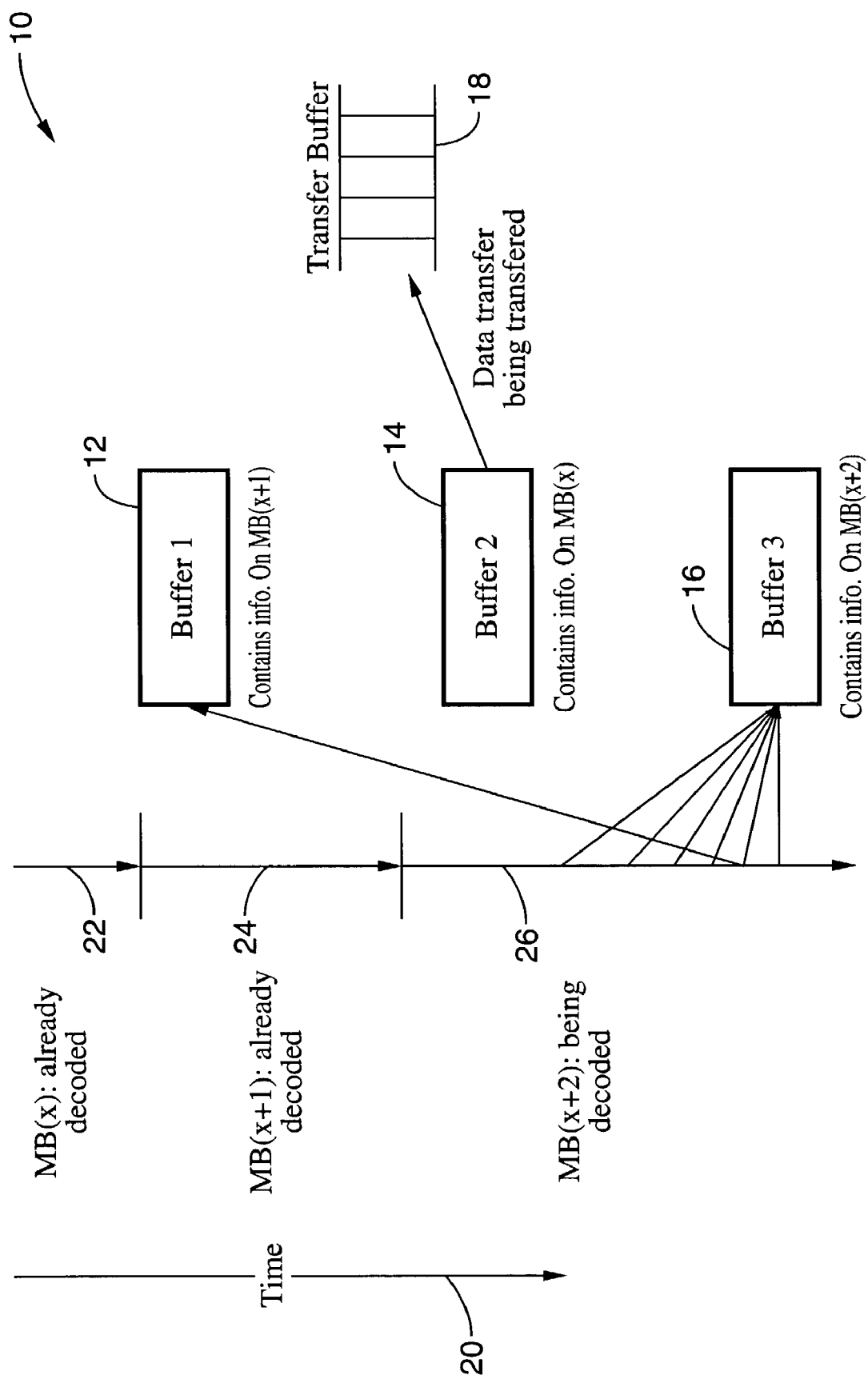
FIG. 10 is schematic of triple-buffering of macroblock information at a subsequent time in relation to FIG. 9, shown at time (x+2).

Referring more specifically to the drawings, for illustrative purposes the present invention is embodied in the apparatus generally shown in FIG. 9 through FIG. 10. It will be appreciated that the apparatus may vary as to configuration and as to details of the parts, and that the method may vary as to the specific steps and sequence, without departing from the basic concepts as disclosed herein.

FIG. 9 and FIG. 10 illustrate consecutive operations according to an embodiment of the triple-buffering method of the present invention. In FIG. 9 a time (x+1) is depicted wherein a first 12, second 14, and third 18 buffer are configured to receive macroblock information for transfer to a transfer buffer 18. Buffer selection is performed in a predetermined sequential order for each operation. Macroblock processing is shown with respect to time 20 and video processing is shown as a set of time periods x within segment MB(x) 22, and segment MB(x+1) 24, wherein upcoming time (x+2) is shown within segment 26. The method of the present invention utilizes a series of three buffers which are configured for retaining the macroblock data within a decoder configured to perform overlapped motion compensation. The macroblock data decoded at a previous stage is not transferred out, but instead receives elements of motion vector information from the current stage. Once all the necessary macroblock information is collected within the buffer, then it is ready for transfer. The situation is represented in FIG. 9 at time (x+1) wherein information for macroblock (x+1) is being collected in the first buffer 12, and additional information for the macroblock within the previous time period x is added to a second buffer 14. The data from a previous time period (x−1) is being transferred out to the transfer buffer. It will be appreciated that the data decoding and transferring are performed simultaneously from different buffers without being subject to communication delays. FIG. 10 illustrates the subsequent time period from x to (x+2), wherein decoding occurs within the first buffer 12 and the third buffer 16, while the second buffer 14 is subject to a data transfer into the transfer buffer.

The present triple-buffering method may be applied to the execution of overlapped motion compensation within video decoders utilizing any of a number of decoding schemes, including MPEG-4 and H.263 video decoders and those incorporating similar architectures.

Accordingly, it will be seen that this invention of a method for reducing the delays associated with decoding a macroblock within a video stream as processed by a multi-processing video decoder. It will be appreciated that the three buffers incorporated within the present invention may be implemented in a number of alternative ways which would be obvious to those of ordinary skill in the art, without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of buffering macroblock data being decoded within a video decoder subject to the execution of overlapped motion compensation, comprising:

collecting macroblock data for time period x+1 within a first buffer of a group of three buffers within a video decoder;

inserting additional macroblock data from time period x+1 into a second buffer of said group of three buffers for time period x, while decoding macroblocks for time period x and x+1; and transferring a macroblock for time period x−1, for which decoding is complete, from a third buffer of said group of three buffers to a transfer buffer, said transferring performed simultaneously with macroblock decoding performed within the first and second buffers;

whereafter sequential selection of each of said three buffers continues through the above steps with subsequent macroblocks, the next of which is a macroblock for time period x+2 to be received by said third buffer of said group of three buffers;

wherein said macroblock data transferred to the transfer buffer is the oldest macroblock data within said three buffers;

wherein said macroblock data contained within said three buffers includes information spanning multiple macroblock periods;

wherein overlapping motion compensation across two macroblocks is executed without incurring additional delays; and wherein data independence is obtained by collecting all necessary information prior to said transferring.

2. A method as recited in claim 1, wherein said buffering method is applicable to MPEG-4, H.263, and equivalent video decoders.

3. A method of buffering macroblock data being decoded within a video decoder subject to the execution of overlapped motion compensation, comprising:

sequentially selecting a first of three buffers from which to transfer macroblock data for a time period x−1 to a transfer buffer;

decoding, simultaneous to said transfer, macroblock data within the remaining two buffers;

inserting additional macroblock data from the current decoding stage into the second of the three buffers, which retains macroblock data from a previous decoding stage; and receiving macroblock data from the current decoding stage for time period x+1 into the third of the three buffers, the macroblock from which was transferred to said transfer buffer for time period x−2 during the previous decoding stage;

continuing to sequentially transfer, insert and receive macroblock data during subsequent time periods;

wherein said macroblock data contained within said three buffers includes information spanning multiple macroblock periods;

wherein overlapping motion compensation across two macroblocks is executed without incurring additional delays; and wherein data independence is obtained by collecting all necessary information prior to said transferring.

4. A method as recited in claim 3, wherein said buffering method is applicable to MPEG-4, H.263, and equivalent video decoders.

5. A method of buffering macroblock data within a multiprocessing video decoder configured to execute overlapped motion compensation, comprising:

transferring macroblock data for period time x−1 from a first buffer to a transfer buffer, said macroblock data which was subject to the receipt of macroblock data for time period x−1 during two prior decoding stages, and which has been decoded prior to said transferring to said transfer buffer;

wherein a second buffer contains macroblock data received for time period x;

inserting additional macroblock data for a current decoding stage into the second buffer which contains macroblock data from a previous decoding stage for period time x;

receiving macroblock data from the current decoder stage for time period x+1 into a third buffer, the macroblock data from said third buffer for time period x−2 having been previously transferred to a transfer buffer; and advancing said decoding stage in preparation for transferring macroblock data for time period x, inserting additional macroblock data for time period x+1, and receiving macroblock data for time period x+2, and continuing sequentially for subsequent time periods;

wherein said macroblock data contained within said three buffers includes information spanning multiple macroblock periods;

wherein overlapping motion compensation across two macroblocks is executed without incurring additional delays; and wherein data independence is obtained by collecting all necessary information prior to said transferring.

6. A method as recited in claim 5, wherein said macroblock buffering method is applicable to MPEG-4, H.263, and equivalent video decoders.

7. A method as recited in claim 5, wherein said advancing of said decoder stage comprises sequentially advancing buffer pointers associated with said transferring, said inserting, and said receiving operations.

8. A method as recited in claim 5:

wherein said third buffer from the previous decoding stage becomes the first buffer in the new decoding stage;

wherein said second decoding stage from the previous decoding stage becomes the third buffer in the new decoding stage;

wherein said first decoding stage from the previous decoding stage, becomes the second buffer for use in the newly entered current decoding stage.

9. A method of buffering macroblock data being decoded within a video decoder subject to the execution of overlapped motion compensation, comprising:

receiving data for a macroblock within one of three buffers coupled to a first processing element which performs all data dependent operations of said video decoder;

inserting additional decoded macroblock data, from a subsequent decoding stage, within one of three buffers which previously received macroblock data; and transferring of the collected macroblock data from the oldest of the three buffers to a transfer buffer for receipt by additional processing elements which perform data independent operations on each macroblock in said transfer buffer of said video decoder;

wherein said macroblock data contained within said three buffers includes information spanning multiple macroblock periods;

wherein overlapping motion compensation across two macroblocks is executed without incurring additional delays; and wherein data independence is obtained by collecting all necessary information prior to said transferring.

10. A method as recited in claim 9, wherein said buffering method is applicable to MPEG-4, H.263, and equivalent video decoders.

11. A method of buffering macroblock data for decoding within an MPEG-4 or H.263 multiprocessing video decoder which is configured to execute overlapped motion compensation, comprising:

receiving data for a macroblock within one of three buffers coupled to a first processing element which performs data dependent operations of said video decoder;

inserting additional decoded macroblock data, from a subsequent decoding stage, within one of three buffers which previously received macroblock data; and transferring of the collected macroblock data from the oldest of the three buffers to a transfer buffer for receipt by additional processing elements which perform data independent operations of said video decoder;

wherein said macroblock data contained within said three buffers includes information spanning multiple macroblock periods;

wherein overlapping motion compensation across two macroblocks is executed without incurring additional delays; and wherein data independence is obtained by collecting all necessary information prior to said transferring.

12. A method of buffering macroblock data for decoding within a multiprocessing video decoder which is configured to execute overlapped motion compensation, comprising:

receiving data for a macroblock within one of three buffers coupled to a first processing element Which performs data dependent operations of said video decoder;

wherein the data of said macroblocks contained within said three buffers includes information spanning multiple macroblock periods from which overlapped motion compensation across two macroblocks is executed without incurring additional delays;

inserting additional decoded macroblock data, from a subsequent decoding stage, within one of three buffers which previously received macroblock data; and transferring of the collected macroblock data from the oldest of the three buffers to a transfer buffer for receipt by additional processing elements which perform data independent operations of said video decoder.

13. A method as recited in claim 12, wherein the buffering method is applicable to MPEG-4, H.263, and equivalent video decoders.

14. A method of buffering macroblock data within an MPEG-4 or H.263 multiprocessing video decoder configured for executing overlapped motion compensation, comprising:

transferring macroblock data from a first buffer, which was subject to the receipt of macroblock data during the prior two decoding stages;

inserting additional macroblock data from the current decoding stage into a second buffer which contains macroblock data from a previous decoding stage;

receiving macroblock data from the current decoder stage into a third buffer, the macroblock data from said third buffer having been transferred to a transfer buffer during the previous decoding stage, prior to said transferring step;

wherein said macroblock data contained within said three buffers includes information spanning multiple macroblock periods wherein overlapped motion compensation across two macroblocks is executed without incurring additional delays and while obtaining data independence by collecting all necessary information prior to said transferring; and advancing said decoding stage;

wherein said advancing of said decoder stage comprises sequentially advancing buffer pointers associated with said transferring, said inserting, and said receiving operations;

wherein said third buffer from the previous decoding stage becomes the first buffer in the new decoding stage;

wherein said second decoding stage from the previous decoding stage becomes the third buffer in the new decoding stage; and wherein said first decoding stage from the previous decoding stage, becomes the second buffer for use in the newly entered current decoding stage.

15. In a multiprocessing video decoder configured for executing overlapped motion compensation, wherein two buffers are utilized alternatively for either collecting macroblock data or from which to transfer macroblock data within a given decoding stage, wherein the improvement comprises:

adding a third buffer to the existing two buffers;

receiving macroblock data within a first of said buffers;

inserting additional macroblock data into a second of said buffers, into which was previously collected macroblock data from the prior decoding stage;

transferring macroblock data from a third of said buffers, into which was previously collected macroblock data over two prior decoding stages; and advancing the decoding stage to subsequently receive macroblock data within the second of said buffer in processing steps (b) through (d) above, and then continuing with data for subsequent macroblocks;

wherein said macroblock data contained within said three buffers includes information spanning multiple macroblock periods:

wherein overlapping motion compensation across two macroblocks is executed without incurring additional delays; and wherein data independence is obtained by collecting all necessary information prior to said transferring.

16. The improvement as recited in claim 15, wherein the decoding method is applicable to MPEG-4, H.263, and equivalent video decoders.

17. The improvement as recited in claim 15, wherein the advancing of said decoder stage comprises sequentially advancing buffer pointers associated with said transferring, said inserting, and said receiving operations.

* * * * *